May 9, 1939.  J. J. NEUMAN  2,157,301
CONVEYER FOR GRANULAR MATERIALS
Filed Nov. 18, 1937
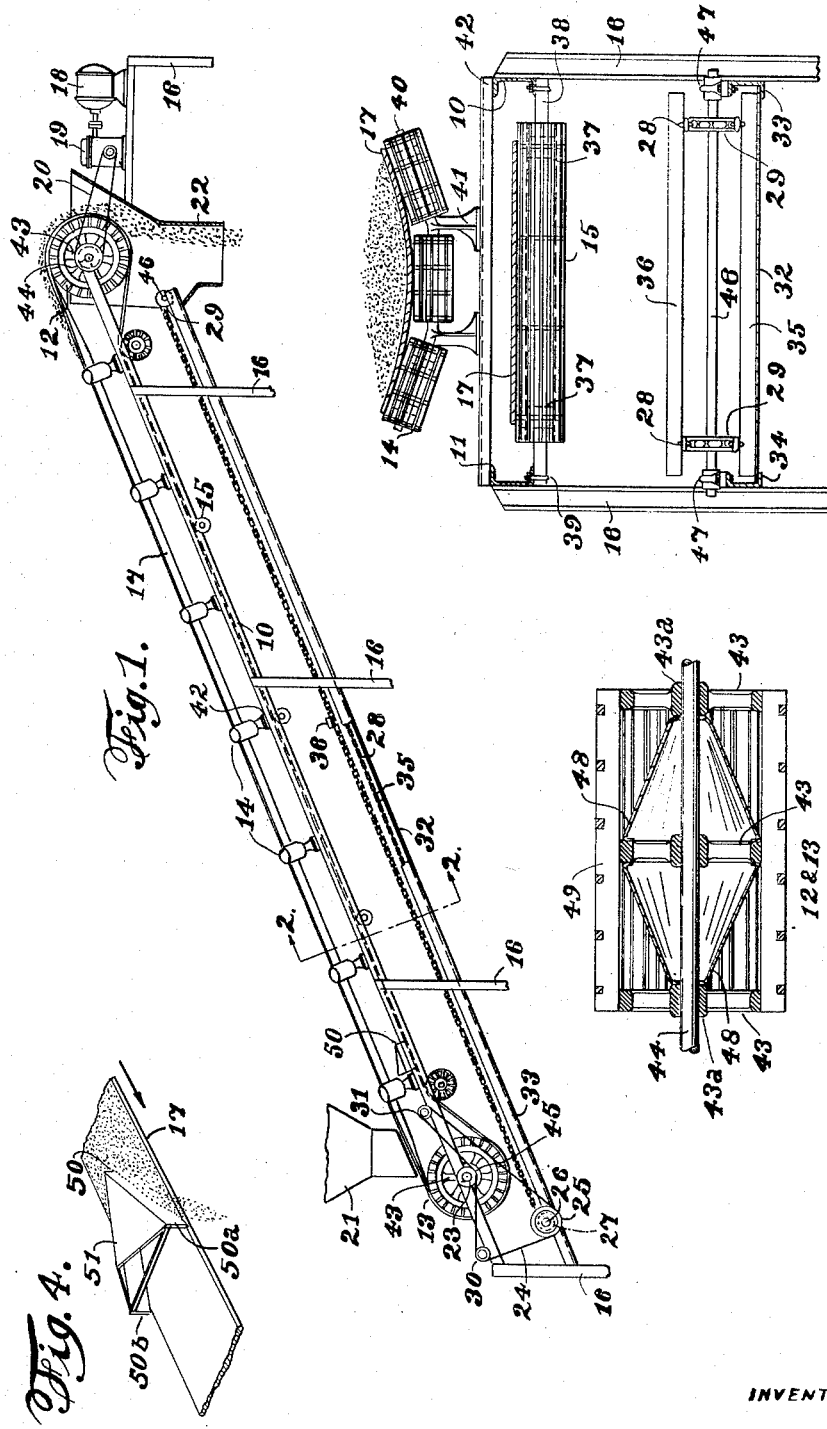
INVENTOR Patented May 9, 1939

2,157,301

UNITED STATES PATENT OFFICE 2,157,301

CONVEYER FOR GRANULAR MATERIALS

Jacob John Neuman, South Salem, N. Y.

Application November 18, 1937, Serial No. 175,204

10 Claims. (Cl. 198—230)

This invention relates to endless belt conveyers for the conveying in bulk of granular materials and especially those of a sticky nature, such as raw sugar, damp refined sugar and other granulated or comminuted materials in a similar condition.

It is the principal object of this invention to provide a conveyer of this type which is self-cleaning in all respects.

Another object of the invention is to provide a conveyer arrangement so formed that all spill from the conveyer will be collected and delivered with the bulk of material being conveyed.

Another object of the invention is to provide a conveyer for cohesive materials so formed that such material cannot build up or cohere to either the conveyer proper, its pulleys, idlers or other parts.

A still further object of the invention is to provide, in a conveyer, pulleys and idlers of a slatted construction.

A further object of my invention is to provide a conveyer combining self-cleaning head and tail pulleys, troughing and return idlers, all of a slatted nature, which are cheap and easy to manufacture, and also to provide an auxiliary or clean out conveyer under the main conveyer which will continuously carry the material falling from the main conveyer or the idlers thereof to the discharge point of the conveyer.

With the foregoing and such other objects in view, as may hereinafter more fully appear, I have invented the device shown in the accompanying drawing, in which:

Figure 1 is a side elevation, partly cut away, showing an inclined conveyer;

Figure 2 is a transverse section on the line 2—2 of Figure 1;

Figure 3 is a detail sectional view of the head or tail pulley taken on its centerline; and Figure 4 is a detail perspective view of the plow 50 in Figure 1.

There are several difficulties encountered in conveying materials of a comminuted, granular or cohesive nature, on an ordinary belt conveyer. No matter whether conveyers of this type are discharged over the end or by a plow positioned diagonally with respect to the belt and discharging over one side, a certain amount of material is bound to adhere to the belt. This is true even when a plurality of plows or scrapers are used. On the return portion of the belt the side to which the material, not discharged, has adhered becomes the under side of the belt and as the belt passes over the idlers which support it the material tends to adhere to the idlers and soon builds up upon the surface thereof causing the belt to run off of its normal course, resulting in excessive wear and shortening the life of the belt. If this is to be prevented frequent cleaning of idlers is necessary, thus increasing the operating cost and necessitating shut-downs. A further difficulty is that a portion of the material, when it has adhered to the belt, becomes loosened during the return passage of said belt and drops off. This not only makes the location of the conveyer look unsightly but involves considerable labor cost for removal of the spilled material. The material also tends to build up on the idlers supporting the belt on its forward travel and also on the head and tail pulleys of the conveyer.

Referring now to the drawing, 10 and 11 designate two spaced apart parallel channel members in opposed relation to one another forming a support for the head pulley 12, the tail pulley 13, the troughing idlers 14, and the return idlers 15. Said channel members 10 and 11 are in turn supported by vertical column members 16. A conventional type of fabric conveyer belt 17 passes around the head pulley 12, and the tail pulley 13, and is supported on its forward and return runs by the troughing idlers 14 and the return idlers 15. The head pulley 12 is driven by the motor 18 through a suitable reduction gear unit 19 and the chain drive 20.

The material (such as raw sugar, for instance) to be conveyed is fed to the belt by the hopper 21, and in the embodiment shown, is discharged over the end of the belt, at the head pulley, into the hopper 22.

The tail pulley 13 has the sprocket 23 mounted on one end of the shaft thereof driving the chain 24, which in turn, drives the sprocket 25 mounted on the shaft 26. Mounted on the shaft 26 are also the chain sheaves 27. Two endless chains 28 are driven by the said sheaves 27, and at the upper end of the conveyer, near the head pulley 12, are trained over the idler sheaves 29 keyed to the shaft 46 supported by the bearings 47 mounted on the members 10 and 11. The driving chain 24 passes over two idler pulleys 30 and 31 the purpose of which is to so align the chain 24 that the tail pulley 13 may be moved longitudinally along the members 10 and 11 to compensate for stretching of the conveyer belt 17 without disturbing the chain 24.

Under the entire conveyer belt 17 there is disposed the sheet metal spill pan 32, supported by the longitudinal members 33 and 34, and connecting at one end with the hopper 22. The chains 28 have the scraper members 35 and 36 fixed thereto and spaced so that as the chains 28 move along the spill pan 32, certain of the scraper members, such as the member 35, move up said spill pan 32 towards the head pulley 12 on the lower run of the endless chains 28, and certain other of said members 36 move toward the tail pulley 13 on the upper run of the chains 28.

The return idlers 15 are of the same type as the idler disclosed in my Patent No. 2,023,611, being comprised of a preformed welded steel grating rolled around the bearings 37 carried on the shafts 38, which are supported by the U-bolts 39 fastened to the members 10 and 11.

The troughing idlers 14 are composed of three sections each similar to the return idlers 15, but shorter and have their shafts 40 supported by the brackets 41 fastened to the transverse members 42, in turn supported by the members 10 and 11. The other of these idlers 14a and 14b are upwardly inclined relative to the center horizontally disposed idler 14c.

The head and tail pulleys 12 and 13 are of similar construction but are made of the heavier grating 49, which is rolled around the three pulleys 43, keyed to the shafts 44, journaled in the bearings 45. Two sheet metal cones 48 and 48' are built into the said head and tail pulleys 12 and 13. The cones 48 have a diameter at the large inner end equal to the diameter of the pulleys 43 and a diameter at their small outer ends equal to the diameter of the hubs 43a of the pulleys 43. The length is equal to the distance between the center and outside ends of the pulleys 43. In operation these cones 48 have the tendency to work material falling from between the bars of the grating 49 toward the outside pulleys 43 and to finally discharge it from between the spokes of said outer pulleys 43. Where these cones 48 are not used the material falling from the top of the pulleys 12 and 13 merely falls to the bottom and is carried around to the top again and the process repeats eventually choking up the entire space inside the pulley.

Part of the material which falls from the troughing idlers 14 remains on the return portion of the belt 17, and is conveyed toward the tail pulley 13. In order to remove the greater part of this material a V-shaped plow 50 is placed upon the return portion of the belt 17 near the tail pulley end. The said plow 50 is composed of two vertical walls 50a and 50b joined at a suitable angle at one end and spreading to a width slightly greater than that of the belt 17. The top of the plow is covered with a V-shaped roof 51 so that material falling on the said roof 51 will slide off to the outside of the plow walls 50a and 50b and be plowed off of the belt 17 instead of falling inside of the walls 50a and 50b and remaining on the belt. The material thus discharged from the belt falls into the spill pan 32 and is eventually carried to the hopper 22. The angle of the plow roof 51 to the horizontal should be slightly greater than the angle of repose of any material that the conveyer is intended to convey.

In operation the motor 18 drives the head pulley 12 in a clockwise direction, as viewed in Figure 1, thus moving the belt 17 and conveying material from the hopper 21 to the hopper 22. The tail pulley 13, thus turns and drives the chains 28 by means of the sprocket 23, the drive chain 24 and the sprocket 25 which rotates in a counterclockwise direction, as viewed in Figure 2. The scraper member 25, thus moves towards the hopper 22, carrying the material which has dropped into the spill pan 32, with it, and finally pushing it off of the end of said pan 32 into the hopper 22. The scraper member 35 now goes around the idler sheaves 29 and starts down towards the end of the spill pan 32 nearest the tail pulley 13, the said scraper member 35 now being supported by the chains 28 out of contact with the spill pan 32. Thus, as soon as material falls from the belt or idlers thereof, it is caught in the spill pan 32 and conveyed to the hopper 22.

Although the embodiment of the invention illustrated is applied to an inclined conveyer, it is obvious that it can be applied just as well to a flat conveyer.

It is also obvious that various changes and modifications may be made in the details of construction of the above specifically described embodiment of my invention, without departing from the spirit thereof, such changes and modifications being restricted only by the scope of the following claims.

I claim:

1. In a conveyer, means for collecting material spilling therefrom, and delivering said collection with the material being conveyed, said means including a spill pan mounted under the conveyer and extending longitudinally thereof below all parts of said conveyer.

2. In a conveyer, means for collecting material spilling therefrom, and delivering said collection with the material being conveyed, said means including a spill pan mounted under the conveyer and extending longitudinally thereof below all parts of said conveyer, and means operating in said pan for conveying material therein to the point of delivery of said conveyer.

3. In a conveyer, means for collecting material spilling therefrom, and delivering said collection with the material being conveyed, said means including a spill pan mounted under the conveyer and extending longitudinally thereof below all parts of said conveyer, and means operating in said pan for conveying material therein to the point of delivery of said conveyer, said last means comprising an endless scraper conveyer.

4. The device, as claimed in claim 3, and means for operating the latter conveyer.

5. The device, as claimed in claim 3, and means for operating the latter conveyer, said last means being operated through the first conveyer.

6. In combination, an endless conveyer, a spill pan extending throughout the length and under all parts thereof, and means whereby material spilled on said pan is conveyed to the point of delivery of said conveyer.

7. In combination, an endless conveyer, a spill pan extending throughout the length and under all parts thereof, and means whereby material spilled on said pan is conveyed to the point of delivery of said conveyer, said conveyer having a driving means through which said last means is operated.

8. The device, as claimed in claim 7, said last means consisting of a pair of endless chains and spaced apart scraper members connecting said chains.

9. In combination, an endless conveyer, a spill pan extending throughout the length and under all parts thereof, and means whereby material spilled on said pan is conveyed to the point of delivery of said conveyer, said conveyer having a driving means through which said last means is operated, said last means consisting of a pair of endless chains and spaced apart scraper members connecting said chains, said conveyer comprising a flexible belt, means for troughing said belt.

10. In combination, a conveyer consisting of an endless belt having forward and return runs, head and tail pulleys, intermediate idler pulleys supporting said forward and return runs, means for cleaning said forward and return runs said head and tail pulleys and said intermediate idler pulleys, spill pan means mounted below said conveyer and extending longitudinally thereof below all parts of said conveyer for collecting material cleaned from said parts, and including means operating in said spill pan means for conveying material so cleaned together with spilled material from said forward run to the point of delivery of said conveyer.

JACOB J. NEUMAN.